(12) United States Patent
Gardiner et al.

(10) Patent No.: US 7,710,416 B2
(45) Date of Patent: May 4, 2010

(54) METHOD FOR RENDERING VOLUMETRIC OBSCURANTS

(75) Inventors: Harold Dee Gardiner, Sandy, UT (US); Russell Joseph Urry, West Jordan, UT (US)

(73) Assignee: Rockwell Collins Simulation And Training Solutions LLC, Cedar Rapids, IA (US)

( * ) Notice: Subject to any disclaimer, the term of this patent is extended or adjusted under 35 U.S.C. 154(b) by 288 days.

(21) Appl. No.: 10/969,313

(22) Filed: Oct. 19, 2004

(65) Prior Publication Data

US 2006/0082576 A1    Apr. 20, 2006

(51) Int. Cl.
G06T 15/40 (2006.01)
(52) U.S. Cl. ...................................... 345/422
(58) Field of Classification Search ............... 345/952
See application file for complete search history.

(56) References Cited

U.S. PATENT DOCUMENTS

| | | | | |
|---|---|---|---|---|
| 5,339,386 | A * | 8/1994 | Sodenberg et al. | 345/422 |
| 5,471,567 | A * | 11/1995 | Soderberg et al. | 345/615 |
| 6,184,857 | B1 * | 2/2001 | Latham | 345/589 |
| 6,268,861 | B1 * | 7/2001 | Sanz-Pastor et al. | 345/426 |
| 6,762,760 | B2 * | 7/2004 | Deering | 345/426 |
| 7,046,243 | B1 * | 5/2006 | Mech | 345/426 |

OTHER PUBLICATIONS

Rick D. Bess, "Battlefield Smoke—A New Dimension in Networked Simulation," 1991, BBN Systems and Technologies Division, p. 256-261.*
Venceslas Biri, Sylvain Michelin, Didier Arques, "Real-Time Animation of Realistic Fog," Jun. 26, 2002, Proceedings of the 13th Eurographics Workshop on Rendering.*
Mark J. Harris, Anselmo Lastra, "Real-Time Cloud Rendering," Sep. 2001, Computer Graphics Forum (Eurographics 2001 Proceedings), vol. 20, No. 3, p. 76-84.*
James D. Foley, Andries van Dam, Steven K. Feiner, John F. Hughes, Computer Graphics: Principles And Practice, 2nd edition, 1996, p. 642-646.*
Abraham Mammen, "Transparency and Antialiasing Algorithms Implemented with the Virtual Pixel Maps Technique," Jul. 1989, Computer Graphics and Applications, IEEE, vol. 9, Issue 4, p. 43-55.*
Gernot Schaufler, "Nailboards: A Rendering Primitive for Image Caching in Dynamic Scenes," Jun. 16, 1997, Proceedings of the Eurographics Workshop on Rendering Techniques '97, pp. 151-162.*

(Continued)

Primary Examiner—Ulka Chauhan
(74) Attorney, Agent, or Firm—Thorpe North & Western LLP

(57) ABSTRACT

A method is disclosed for rendering a volumetric obscurant in a computer generated graphical image. The method can include the operation of defining a polygon template as a first surface of the volumetric obscurant comprising pixels and sub-pixels. A further operation can be spreading a depth of the sub-pixels for pixels in the polygon template to create a thickness in the volumetric obscurant. Finally, another operation can be modulating a depth density of the sub-pixels to vary the distances between the sub-pixels in the volumetric obscurant.

22 Claims, 4 Drawing Sheets

OTHER PUBLICATIONS

Kevin Kreeger, Arie Kaufman, "Mixing Translucent Polygons with Volumes," Oct. 1999, Proceedings of the Conference on Visualization '99: Celebrating Ten Years, pp. 191-198.*

Mark Segal, Kurt Akeley, "The OpenGL Graphics System: A Specification (Version 1.5)", Oct. 30, 2003, pp. 68-90.*

Morgan McGuire, Andi Fein, Colin Hartnett, "Real-Time Cartoon Rendering of Smoke," ACM SIGGRAPH 2004 Posters, Aug. 8, 2004.*

Nelson L. Max, "Light Diffusion Through Clouds and Haze", Lawrence Livermore National Laboratory, vol. 33, May 10, 1984.

James T. Kajiya et al., "Ray Tracing Volume Densities", California Institute of Technology, Computer Graphics, vol. 18, No. 3, Jul. 1984, p. 165-174.

Rick D. Bess, "Battlefield Smoke-A New Dimension in Networked Simulation", BBN Systems and Technologies Division, p. 256-261.

William T. Reeves, "Particle Systems—A Technique for Modeling a Class of Fuzzy Objects", ACM Transactions on Graphics, vol. 2, No. 2, Apr. 1983, p. 91-108.

David S. Ebert, "Rendering and Animation of Gaseous Phenomena by Combining Fast Volume and Scanlife A-buffer Techniques", Department of Computer and Information Science, Computer Graphics, vol. 24, No. 4, Aug. 1990, p. 357-366.

William T. Reeves et al., "Approximate and Probabilistic Algorithms for Shading and Rendering Structured Particle Systems", San Francisco Jul. 22-26, vol. 19, No. 3 1985, p. 313-322.

Geoffrey Y. Gardner, "Visual Simulation of Clouds", San Francisco Jul. 22-26, vol. 19, No. 3, p. 297-303.

* cited by examiner

METHOD FOR RENDERING VOLUMETRIC OBSCURANTS

FIELD OF THE INVENTION

The present invention relates generally to generating volumetric computer generated images.

BACKGROUND

Most computer graphics devices currently available are very efficient at rendering points, lines, and polygons. Some even support more complex surfaces, but when it comes to rendering volumetric objects such as smoke or clouds, the application developer is often left to develop unique solutions.

Beginning in the early 1980's, various approaches have been developed for rendering volumetric obscurants. William T. Reeves introduced particle systems in 1983. James Kajiya published an approach using ray tracing in 1984. Geoffrey Y. Gardner discussed a method of rendering clouds using textured ellipsoids. David S. Ebert and Richard E. Parent combined volumetric techniques with the popular Scanline A-buffer in 1990. Richard Voss developed a technique based upon fractals, while Nelson Max used height fields. In 1991, Rick D. Bess and Brian T. Soderberg developed a technique specifically for the simulation of smoke on the battlefield.

While not an exhaustive list of approaches, it is clear that there are numerous methods for rendering volumetric obscurants. Because of the complexity of the volumetric phenomenon, there has not yet been a single algorithm that is cost effective, efficient, and visually sufficient for all graphics applications. Particle systems create very realistic results, but a large quantity of particles is required. Consequently, a particle system approach may be fine for non-time-critical applications, but it is not appropriate for many real-time or interactive applications. Ray tracers also produce good results, but hardware accelerators are not commonly available. Thus, many applications simply do their best to simulate volumetric effects using points, lines, or polygons, since low cost graphics devices are readily available which efficiently handle these primitives.

Polygons with textures can be used to render very realistic looking clouds in the distance, but as the eye position or other objects get near or even penetrate the volume, the illusion starts to fall apart. Not only should the object 'look' like a cloud, it preferably will 'behave' like a cloud to complete the illusion. For example, polygonal techniques work fine when an observer views an object that is in front of a cloud or fully behind a cloud, but as an object penetrates a cloud, the volumetric nature of the cloud must be properly accounted for. The portions of the object near the front (as seen from the observer's position) of the cloud may be mostly visible, while more distant portions of the object may be mostly or even totally obscured. Maintaining this volumetric behavior can enhance the realism of rendered scenes.

It is common practice to use a single polygon with a texture pattern to simulate complex objects. Certain classes of polygons are processed such that they always face the observer. These polygons are often referred to as 'stamps', 'splats', or 'imposters'. This technique can be very effective for the simulation of distant clouds and other volumetric effects. Each cloud puff can comprise a single polygon with a texture pattern. From a distance, a polygon image with a texture can be fairly realistic looking. However, if an object moves through what should be a volumetric obscurant, such as a cloud that is simulated with a two dimensional polygon, it will become apparent as the object moves through the cloud stamp that each cloud puff is really just a flat billboard-like polygon.

For example, as an aircraft penetrates a polygon with a texture pattern designed to simulate a cloud, a portion of the aircraft is in front of and a portion behind the polygon. Instead of a volumetric obscuration of the aircraft, the polygon will cause a hard, planar interpenetration. The portion of the aircraft in front of the polygon will be fully visible while that portion lying behind may be totally obscured. This hard edge will be readily apparent to a viewer, giving away the polygonal structure of the cloud and breaking the illusion of a volumetric cloud. Of course, the situation can be improved by using more polygons. Unfortunately, to achieve high quality results you have to use a very large number of small polygons, which in the limit is a particle system.

SUMMARY OF THE INVENTION

A method is disclosed for rendering a volumetric obscurant in a computer generated graphical image. The method can include the operation of defining a polygon template as a first surface of the volumetric obscurant comprising pixels and sub-pixels. A further operation can be spreading the sub-pixels in depth for each pixel in the polygon template to create a thickness in the volumetric obscurant. Finally, another operation can be modulating a depth density of the sub-pixels to vary the distances between the sub-pixels in the volumetric obscurant.

Additional features and advantages of the invention will be apparent from the detailed description which follows, taken in conjunction with the accompanying drawings, which together illustrate, by way of example, features of the invention.

DETAILED DESCRIPTION

Figure 1:
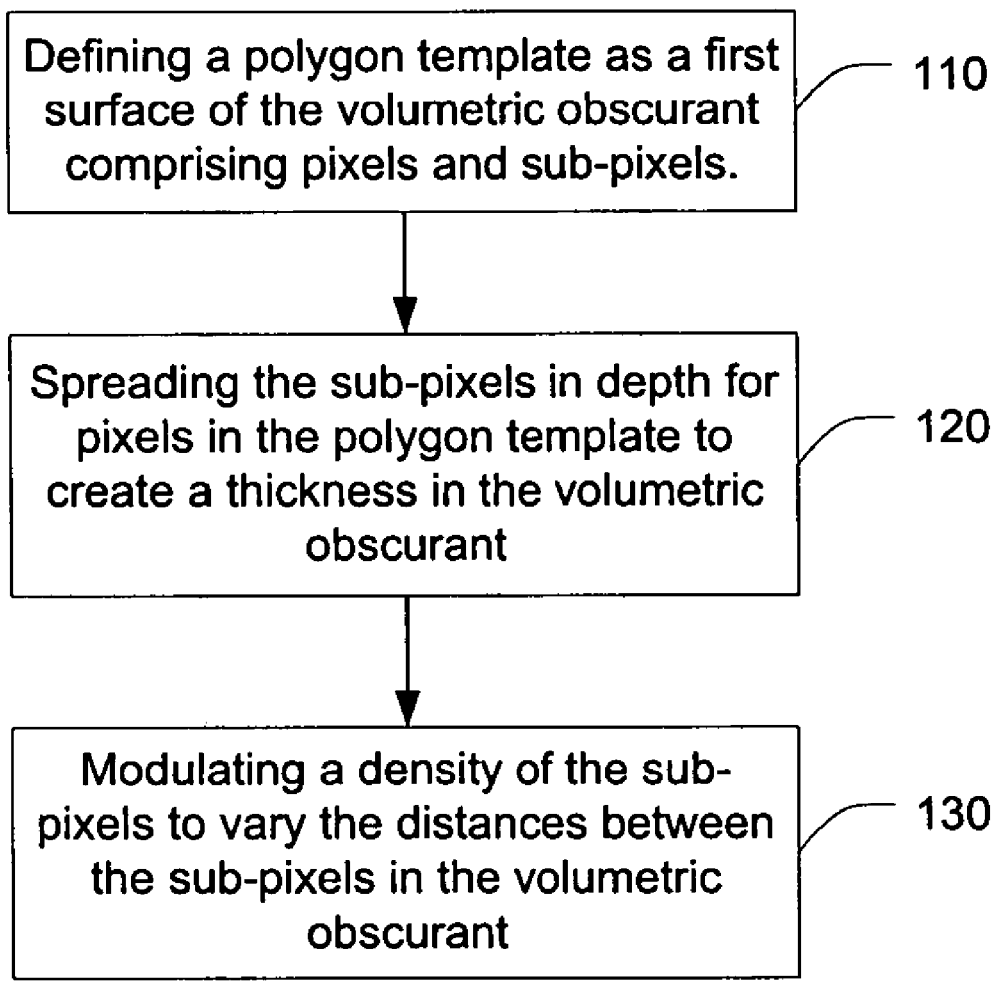
FIG. 1 is a flow chart depicting a method for rendering a volumetric obscurant in a computer generated graphical image in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In order to overcome the problems described and to provide an efficient method for rendering volumetric obscurants, the present invention provides a method for rendering volumetric obscurants as illustrated in the flowchart of FIG. 1. The method includes step 110 which involves defining a polygon template as a first surface of the volumetric obscurant comprising pixels and sub-pixels. The polygon template can be a standard stamp polygon or another type of polygon. A stamp polygon typically comprises a color texture and an alpha texture. For example, with a stamp polygon of a cloud, the color texture can give the stamp polygon the 'look' of the cloud and the alpha texture can give the stamp the 'shape' of the cloud. The polygon template may be configured to face the eye-point so that the template is always facing the viewer. Each pixel in the polygon template can comprise a plurality of subpixels that are used to more accurately model the template.

Figure 2:
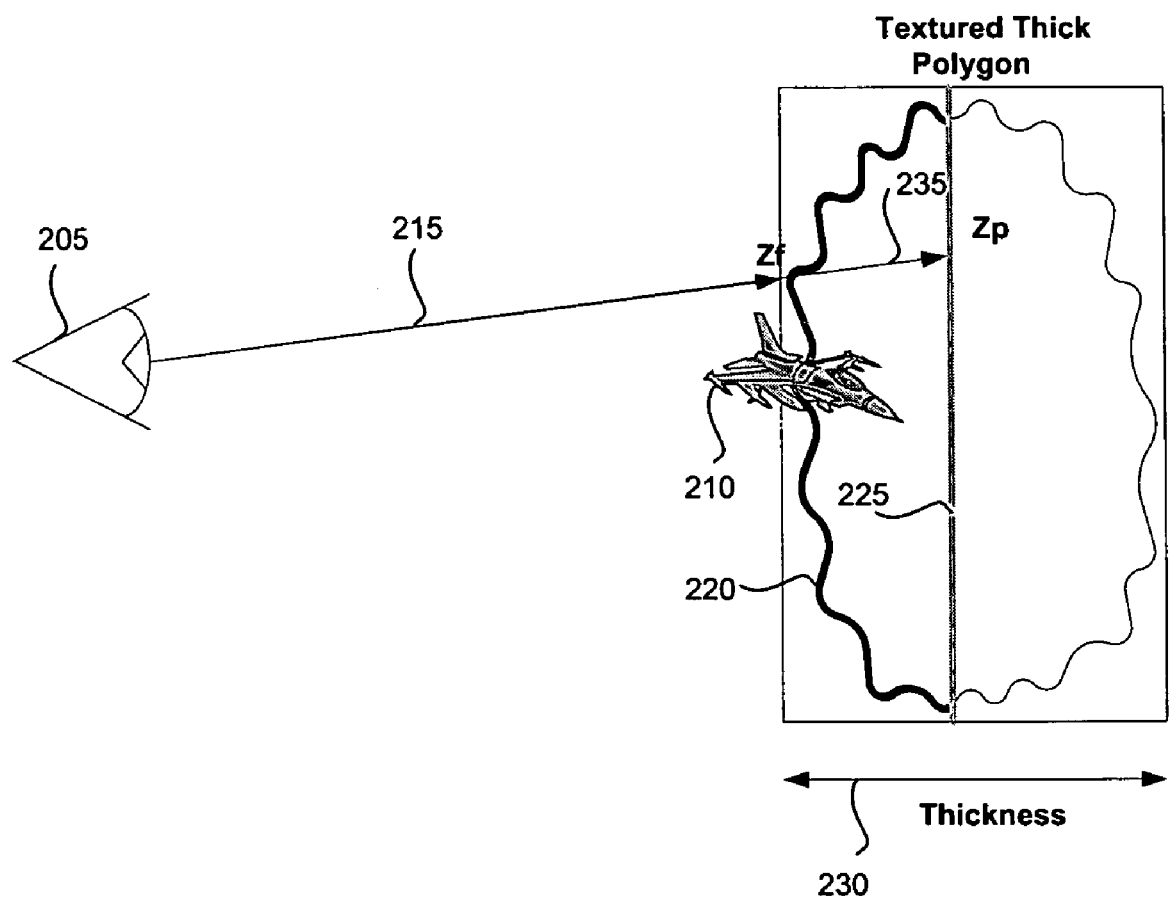
FIG. 2 is a diagram illustrating an embodiment of the present invention containing a polygon template with a depth modulated texture.

The polygon template can be modified to add a thickness 230, as shown in FIG. 2. This can be accomplished by modifying a depth calculation for each pixel touched by the polygon template. A depth to the front of the planar polygon, as measured from the eye-point 205 to the planar surface 225 can be labeled $Z_p$ 235. A modified depth to the non-planar front surface of the polygon $Z_f$ 215 can be computed by using a thickness value ($T_f$) and a thickness modulation texture ($txt_f$), as follows:

$$Z_f = Z_p - 1/2(T_f * txt_f) \text{ where } 0 \le txt_f < 1$$

Obviously, equivalent results can be obtained using equations that have been modified from the equation disclosed above. Modulating the depth of the polygon template can solve the planar interpenetration problem. When a simulated object such as an airplane 210 approaches and passes through a polygon template with a planar surface 225, it becomes obvious that the template is planar. For example, a simulated cloud may appear realistic at a distance, but as the airplane passes through the simulated cloud the planar surface becomes apparent.

When the airplane 210 approaches and passes through the polygon template with a modulated depth 220 the surface will appear bumpy, allowing the simulation to be more realistic. The aircraft can become occluded as it penetrates the bumpy front surface of the cloud.

Figure 3:
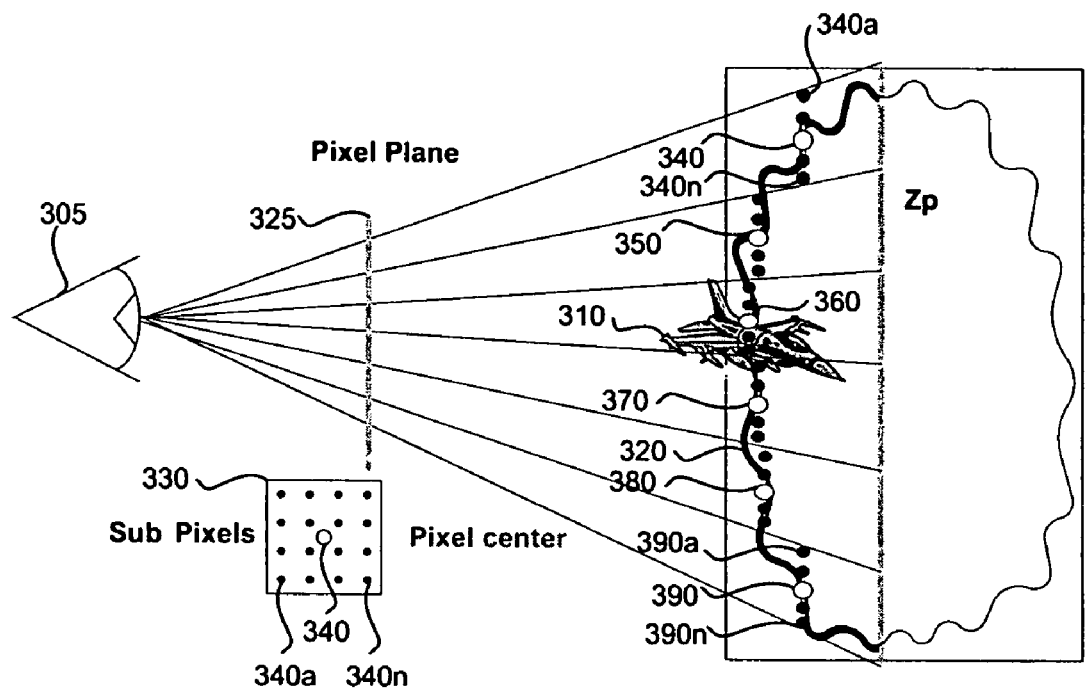
FIG. 3 is a diagram showing an embodiment of the present invention containing the depth texture modulated polygon template and illustrating the pixels and sub-pixels which comprise the polygon template.

The next step is to address the volumetric nature of the cloud used in the above example. This can be accomplished by exploiting the anti-aliasing capability available in most high-end graphics devices. FIG. 3 shows a display screen, or pixel plane 325. Pixels 340-390 are shown representing the pixels comprising the polygon template. A diagram shows one possible representation of a pixel structure 330 with a pixel center 340 and an array of sub-pixels 340$a$-340$n$. This arrangement is chosen for illustration and does not suggest that the solution is dependent on this arrangement. Any number of pixels and sub-pixels can be used with the present invention.

A typical graphics device computes the depth to the polygon at each pixel center 340-390. The depth to the polygon $Z_p$ 235 (FIG. 2) can be modified by the polygon thickness 230 and texture parameters as described above. This gives the depth to the bumpy textured skin, as shown by the pixels 340-390. Since the polygon template or stamp is perpendicular to the line of sight, the depth for each sub-pixel, as used in prior graphics systems, is approximately the same as the depth for the pixel center, as shown with the sub-pixels 340$a$-$n$ to 390$a$-$n$.

By filtering all of the sub-pixel values together, the depth modulated polygon 320 can appear as a smooth anti-aliased image. In the case of a polygon template 320, the sub-pixels' colors will typically be the same unless the pixel lies on the outer perimeter of the polygon or if there is another polygon within the same pixel. Sub-pixels are used primarily when another polygon 310 is penetrating the polygon template 320. In the example shown in FIG. 3, some of the impinging polygon sub-pixels will lie in front of the polygon template and some behind. After filtering, the template will appear to have an anti-aliasing penetration.

Figure 4:
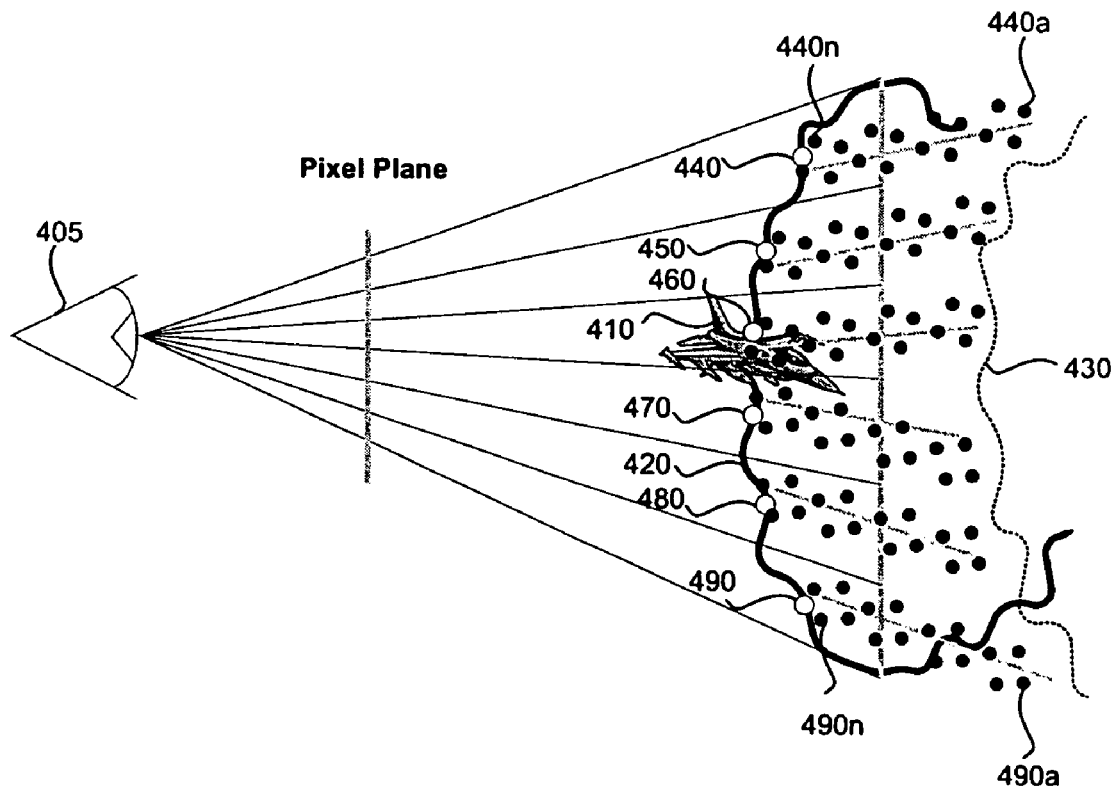
FIG. 4 is a diagram illustrating an embodiment of the present invention containing the polygon template of FIG. 3 with the sub-pixels depth modulated to create a thickness for the polygon template.

The function of sub-pixels within the polygon template, used in prior graphics systems to deal with interpenetration, can also be used to give a volumetric type of behavior, as shown in FIG. 4. The method can include the further step 120 (FIG. 1) that includes spreading the sub-pixels in depth for pixels in the polygon template to create a thickness in the volumetric obscurant. A 'cloud' of sub-pixel particles can be created by offsetting each sub-pixel 440$a$-$n$ to 490$a$-$n$ in depth, as compared to the eye-point 405. An object that lies between the first sub-pixel, for example 440$a$ and the last sub-pixel 440$n$, can be partially obscured. Objects lying further than the most distant sample are completely occluded. This step can essentially take an opaque polygon and spread it out in depth, giving it an apparent thickness.

The spread of the sub-pixels or distance between sub-pixels 440$a$-$n$ to 490$a$-$n$ can be controlled to control the density of the cloud. If the sub-pixels are spread out in depth, then the polygon template (in this case a cloud) will become less dense. In the illustration in FIG. 4, each pixel 440-490 has essentially the same spread, but it is quite feasible to modulate the spread with a texture value or some other parameter value, in order to provide a non-homogeneous density profile for the volume.

With each of the sub-pixels spread out to create a thickness in the polygon template 420, an object such as the aircraft 410 can be occluded one sub-pixel at a time (per pixel) as it flies through the cloud. This can create a gradual transition from the aircraft being completely visible to completely obscured. The dashed line 430 represents the point where the cloud becomes fully opaque. Thus, the opaque polygon template can be spread out to create a volumetric obscurant. The volumetric obscurant's depth and density can be controlled by varying the distance at which the sub-pixels are spread. Additional steps can be used, however, to create a volume with more functionality.

Figure 5:
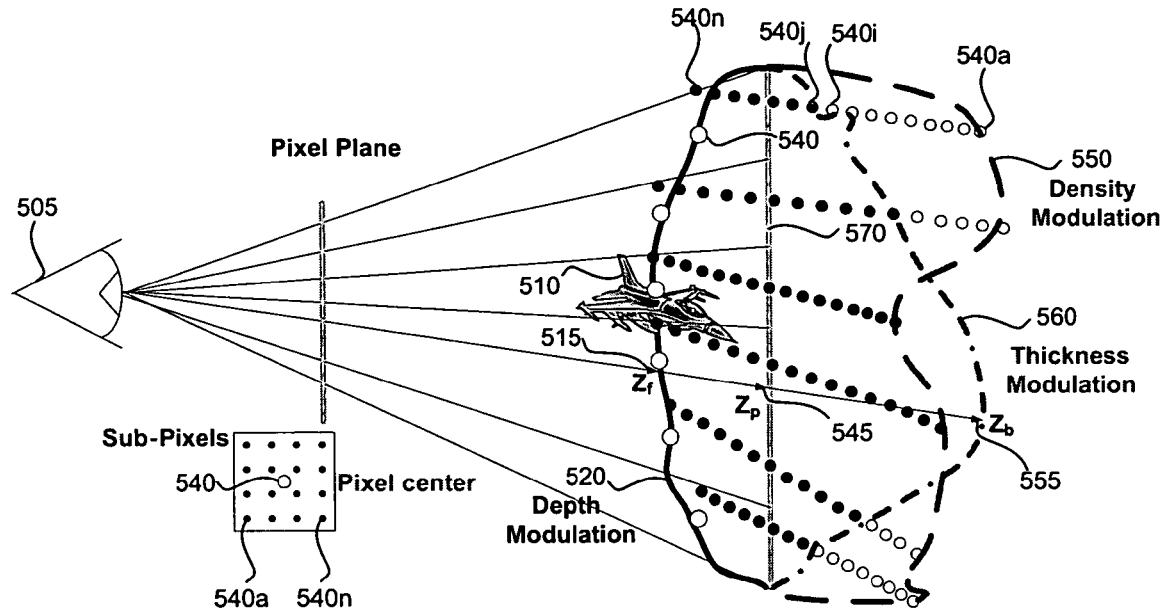
FIG. 5 further illustrates a density modulation to control the spread of the sub-pixels and a thickness modulation to control the thickness of the polygon template in accordance with an embodiment of the present invention.

FIG. 5 shows a volumetric obscurant in the form of a cloud puff with additional functionality. The vertical line near the center of the puff represents the actual stamp polygon 570. The depth modulation line 520 indicates the depth values that can be sent to the depth buffer as a result of texture modulating the depth values for pixels, as shown in FIG. 2. The density modulation line 550 shows how an additional parameter can be used to modulate the depth density value, which controls the spread of the sub-pixels, such as 540$a$-$n$. The concept of modulating the depth density value is also shown as a further step 130 of the method of FIG. 1, which includes modulating a depth density of the sub-pixels to vary the distances between the sub-pixels in the volumetric obscurant.

The thickness modulation line 560 represents the back surface of the cloud. The back surface of the cloud, the surface furthest from the eye-point 505, can be formed using a similar equation used to form the front surface. A depth to the back of the planar polygon, as measured from the eye-point 505 to the planar surface 570, is the same as the depth to the front of the planar polygon $Z_p$ 545, as the planar polygon is two dimensional and thus lacking in depth. A modified depth to the non-planar back surface of the polygon $Z_b$ 555 can be computed by using a thickness value ($T_b$) and a thickness modulation texture ($txt_b$), as follows:

$$Z_b = Z_p + 1/2(T_b * txt_b) \text{ where } 0 \leq txt_b < 1$$

Alternatively, the thickness modulation line, showing the non-planar back surface may also be created by adding a distance to the non-planar front surface $Z_f$ 515.

$$Z_b = Z_f + (T_b * txt_b) \text{ where } 0 \leq txt_b < 1$$

Again, equivalent results can be obtained using equations that have been modified from the equations disclosed above.

The solid sub-pixels 540$j$ to 540$n$ shown in FIG. 5 indicate sub-pixels to pixel 540 which lie inside the cloud. The hollow sub-pixels 540$a$ to 540$i$ can be masked off by an alpha mask since they lie beyond the calculated thickness modulation line 560, which can be used to define the back surface of the cloud. The density modulation line 550 indicates at what depth the cloud becomes opaque due to that pixel's density value, without regard to the actual thickness of the volume. If the density modulation line lies between the depth modulation line 520 (front surface) and the thickness modulation line 560 (back surface) of the cloud, that portion of the cloud will be fully opaque for objects lying behind the density modulation line. Where the density modulation line is behind the thickness modulation line, the volumetric obscurant is not opaque and any more distant objects will be partially visible.

Thus, as an object such as the airplane 510 enters the volumetric obscurant in FIG. 5, shown as a cloud, the airplane will first encounter the depth modulated front surface 520. Depending upon the density modulation 550, which controls the spread and depth variation of the sub-pixels, represented by 540$a$-540$n$, the airplane may disappear slowly or quickly after passing through the bumpy front surface. If the eye-point 505 is directed to an area of the cloud where the density modulation line is beyond the thickness modulation, the viewer can see objects lying beyond the volumetric obscurant. If the eye-point is directed to an area of the cloud where the thickness modulation line 560 is beyond the density modulation line, the view through the volumetric obscurant will be substantially opaque.

A number of special cases can also be considered. For example, one special case occurs when the viewer enters and moves through the cloud. As the eye-point 505 moves through the cloud with the airplane 510, as shown in FIG. 5 for this example, the front surface and some of the sub-pixels go behind the eye-point position, which may cause numerical or clipping problems. There may also be an issue when the eye moves beyond the polygon plane and the polygon gets clipped out of the scene, which may cause the cloud to suddenly disappear from the scene. Such special cases need to be dealt with in a manner that is consistent with the underlying architecture of the graphics device. In one embodiment, the application software can detect such cases and continually move the stamp polygon further back through the volume until it resides on the furthermost portion of the cloud. The cloud volume can be re-projected onto the new stamp plane and create new textures in order to preserve the correct appearance.

Figure 6:
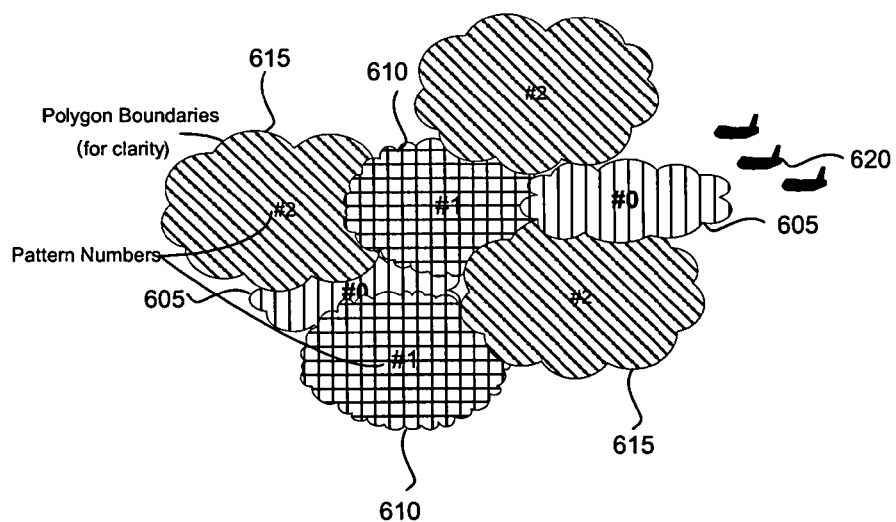
FIG. 6 is a diagram illustrating an embodiment of the present invention showing overlapping polygon templates using different spread functions.

If two volumetric polygons overlap, as shown in FIG. 6, the volumetric behavior can be lost because both polygons will spread out their samples in the same manner. This may potentially result in jaggy pixel interpenetrations of the two polygons. This can be overcome by using a different spread function, such as #0 605, #1 610, and #2 615 on each of the overlapping polygons. For example, the first polygon may spread out the sub-pixels (not shown) such that the first sub-pixel is in front and the last sub-pixel is in back. The second polygon may scramble the order in such a way that each polygon will win some of the sub-pixel depth tests. Thus, multiple patterns can be used to define how the sub-pixels are spread out. Overlapping volumetric polygons can be assigned different spread functions to vary the density modulation 550 (FIG. 5) to allow for multiple volumetric obscurants interpenetrating with a minimum of jaggy pixel interpenetrations. Overlapping volumetric obscurants, such as clouds, can appear unique and different from the point of view of the airplanes 620 from both the exterior of the clouds and from the interior.

The present invention defines a new approach to creating a volumetric obscurant by altering the sub-pixel depth parameters in a polygon template to create a realistic image with a variable front surface, rear surface, and interior density. Localized perturbations within a pixel can be used to give the illusion of a volumetric behavior. However, these perturbations are never seen directly because of the anti-aliasing filter.

This concept has been illustrated utilizing multi-sampling for anti-aliasing. Obviously, the more sub-pixels that are sampled, the better the result due to a higher density of particles. However, the basic notion of pixel localized perturbations to the depth calculation can also be applied to other anti-aliasing schemes. It is not limited to multi-sample architectures.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method for rendering a volumetric obscurant in a computer generated graphical image with a computer graphics device, comprising the steps of:

defining a single polygon template as a volumetric obscurant comprising pixels and sub-pixels;

spreading the sub-pixels in depth using the computer graphics device for pixels in the single polygon template, wherein spreading comprises offsetting a depth of sub-pixels within the pixels from a depth of the related pixel in the single polygon template relative to an eye point to create a non-zero thickness for the single polygon template having a first surface and a second surface separated by the non-zero thickness to represent the volumetric obscurant; and modulating a density of the sub-pixels using the computer graphics device to vary the distances between the sub-pixels for the single polygon template to enable an object passing through the single polygon template to be occluded on a sub-pixel basis as the object passes through the single polygon template.

2. A method as in claim 1, further comprising the step of modulating the depth of the pixels in the single polygon template to provide a non-planar surface for at least one of the first and second surfaces of the single polygon template.

3. A method as in claim 2, further comprising the step of filtering the pixels to smooth transitions between pixels in the single polygon template.

4. A method as in claim 2, further comprising the step of modulating the spread of the pixels in the single polygon template to vary the density of the non-planar first surface of the single polygon template.

5. A method as in claim 2, further comprising the step of modulating the depth of the single polygon template from the eye-point to the single polygon template to form a non-planar first surface of the single polygon template using the equation:

$$Z_f = Z_p - 1/2(T_f * txt_f) \text{ where } 0 \le txt_f < 1.$$

6. A method as in claim 1, further comprising the step of filtering the sub-pixels to smooth the transition between the pixels for the single polygon template.

7. A method as in claim 6, wherein the step of filtering the sub-pixels further comprises the step of filtering the sub-pixels with an anti-aliasing filter.

8. A method as in claim 1, further comprising the step of masking sub-pixels which are located beyond a pre-defined thickness to form at least one of the first and second surfaces based on the masking of the sub-pixels that are located beyond the pre-defined thickness.

9. A method as in claim 1, wherein the step of spreading the sub-pixels in depth further comprises the step of spreading the sub-pixels in depth for each pixel in the single polygon template to create the non-zero thickness for the single polygon template.

10. A method as in claim 9, further comprising the step of varying the sub-pixels' depth for each pixel in the single polygon template to vary the thickness of the single volumetric obscurant such that the second surface is a non-planar second surface.

11. A method as in claim 10, further comprising the step of varying the thickness of the single volumetric obscurant from an eye-point to the single polygon template to form the non-planar second surface of the single polygon template using the equation:

$$Z_b = Z_p + 1/2(T_b * txt_b) \text{ where } 0 \le txt_b < 1.$$

12. A method as in claim 10, further comprising the step of varying the thickness of the single polygon template from an eye-point to the single polygon template to form the non-planar second surface of the single polygon template using the equation:

$$Z_b = Z_f + (T_b * txt_b) \text{ where } 0 \le txt_b < 1.$$

13. A method as in claim 1, wherein the step of defining the single polygon template further comprises the step of utilizing a color texture to further define the single polygon template.

14. A method as in claim 13, further comprising the step of employing an alpha texture to further define the single polygon template.

15. A method as in claim 1, further comprising the step of spacing the sub-pixels more closely to increase the density of the single polygon template.

16. A method as in claim 1, further comprising the step of spacing the sub-pixels farther apart to decrease the density of the single polygon template.

17. A method as in claim 1, further comprising the steps of:
moving the single polygon template trough the volumetric obscurant until it resides on a furthermost portion of the volumetric obscurant whenever an eye-point moves through the first surface of the single polygon template so that the eye-point is in front of the single polygon template as it moves through the volumetric obscurant;
re-projecting the volumetric obscurant onto the moved polygon template; and
creating a new texture on the moved polygon template.

18. A method as in claim 1, further comprising the step of:
using a plurality of spread functions to vary the density of two or more overlapping single polygon templates.

19. A method for rendering a volumetric obscurant in a computer generated graphical image with a computer graphics device, comprising the steps of:
defining a single polygon template comprising pixels and sub-pixels as a surface for the volumetric obscurant; and
spreading a depth of the sub-pixels using the computer graphics device for pixels in the polygon template, wherein spreading comprises offsetting a depth of sub-pixels within the pixels from a depth of the related pixel in the single polygon template relative to an eye point to create a non-zero thickness for the single polygon template to enable an object passing through the single polygon template to be occluded on a sub-pixel basis as the object passes through the single polygon template.

20. A method as in claim 1, wherein spreading the sub-pixels in depth further comprises offsetting the depth of the sub-pixels such that the non-zero thickness of the single polygon template is defined by a distance between the first and second surfaces.

21. A method as in claim 19, further comprising the step of varying the sub-pixels' depth for each pixel in the single polygon template to vary the thickness of the single polygon template to form a non-planar second surface.

22. A method as in claim 19, wherein defining the polygon template as the surface for the volumetric obscurant further comprises defining the polygon template as being located at a position selected from the group consisting of in front of the volumetric obscurant, in back of the volumetric, and within the volumetric obscurant.

* * * * *